United States Patent
Rodrigues et al.

(10) Patent No.: US 9,584,875 B2
(45) Date of Patent: Feb. 28, 2017

(54) INTEGRATED VIDEO CONTENT

(75) Inventors: Ruchir Rodrigues, Dallas, TX (US);
Shafiq Kassam, Lewisville, TX (US);
Enrique Ruiz-Velasco, Flower Mound, TX (US); Donald H. Relyea, Dallas, TX (US); George M. Higa, Plano, TX (US); Mark W. Phillips, Coppell, TX (US); Japan A. Mehta, Coppell, TX (US); Arjun Baskaran, Chennai (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 31 days.

(21) Appl. No.: 13/603,472

(22) Filed: Sep. 5, 2012

(65) Prior Publication Data

US 2014/0068678 A1    Mar. 6, 2014

(51) Int. Cl.
| | | |
|---|---|---|
| H04N 5/445 | (2011.01) | |
| H04N 21/81 | (2011.01) | |
| H04N 21/45 | (2011.01) | |
| H04N 21/462 | (2011.01) | |
| H04N 21/482 | (2011.01) | |

(52) U.S. Cl.
CPC ..... *H04N 21/8126* (2013.01); *H04N 21/4532* (2013.01); *H04N 21/4622* (2013.01); *H04N 21/4821* (2013.01); *H04N 21/4826* (2013.01); *H04N 21/4828* (2013.01)

(58) Field of Classification Search
CPC ............. H04N 21/4622; H04N 21/482; H04N 21/4826

USPC .............................................. 725/48, 51, 25
See application file for complete search history.

(56) References Cited

U.S. PATENT DOCUMENTS

| | | | | |
|---|---|---|---|---|
| 5,619,274 | A * | 4/1997 | Roop | G04G 15/006 348/461 |
| 5,635,979 | A * | 6/1997 | Kostreski et al. | 725/132 |
| 5,943,467 | A * | 8/1999 | Beyers | G04G 15/006 348/E7.036 |
| 5,956,716 | A * | 9/1999 | Kenner et al. | |
| 6,460,181 | B1 * | 10/2002 | Donnelly | H04N 5/44543 348/E5.104 |
| 6,769,128 | B1 * | 7/2004 | Knee | A63F 13/12 348/564 |
| 7,546,623 | B2 * | 6/2009 | Ramraz et al. | 725/48 |
| 7,567,983 | B2 * | 7/2009 | Pickelsimer | |
| 7,657,520 | B2 * | 2/2010 | Chen et al. | 707/751 |
| 8,139,162 | B2 * | 3/2012 | Blanchard et al. | 348/732 |

(Continued)

*Primary Examiner* — Pankaj Kumar
*Assistant Examiner* — Timothy Newlin

(57) ABSTRACT

A method includes receiving a request, associated with a user profile, for an integrated video guide for a video service. The integrated video guide is time based, and the video service includes broadcast video content and video service selected video content. The video service selected video content is provided via unicast or multicast. The method includes identifying basic video channels that are provided to all subscribers of the video service, and identifying user selected channels that are provided based on the user profile. Broadcast channels that are included in the user selected channels are identified. Online channels that are included in the user selected channels are also identified. The method also includes presenting the basic video channels, the broadcast channels, and the online channels in a same manner in the integrated video guide.

20 Claims, 10 Drawing Sheets

(56) References Cited

U.S. PATENT DOCUMENTS

| | | | |
|---|---|---|---|
| 2002/0038358 A1* | 3/2002 | Sweatt, III | H04N 5/44543 709/218 |
| 2002/0087661 A1* | 7/2002 | Matichuk | B60P 3/34 709/218 |
| 2002/0108111 A1* | 8/2002 | Cezeaux | H04N 5/44543 725/39 |
| 2002/0157098 A1* | 10/2002 | Zustak | H04N 5/782 725/51 |
| 2002/0170062 A1* | 11/2002 | Chen et al. | 725/86 |
| 2003/0051246 A1* | 3/2003 | Wilder | H04N 5/44543 725/49 |
| 2003/0070168 A1* | 4/2003 | Stone | H04N 5/44543 725/37 |
| 2003/0130979 A1* | 7/2003 | Matz | H04N 7/16 |
| 2003/0167471 A1* | 9/2003 | Roth | G06F 3/0481 725/87 |
| 2003/0179320 A1* | 9/2003 | Kim | H04N 5/44543 348/732 |
| 2004/0078807 A1* | 4/2004 | Fries | H04N 21/8586 725/14 |
| 2005/0022241 A1* | 1/2005 | Griggs | H04N 5/4401 725/48 |
| 2006/0130098 A1* | 6/2006 | Rao | H04N 5/44543 725/53 |
| 2006/0259926 A1* | 11/2006 | Scheelke et al. | 725/48 |
| 2007/0006261 A1* | 1/2007 | Tsukamoto | H04N 5/44513 725/39 |
| 2007/0061842 A1* | 3/2007 | Walter | H04N 5/44543 725/48 |
| 2009/0094646 A1* | 4/2009 | Walter | H04N 7/17318 725/48 |
| 2009/0138918 A1* | 5/2009 | Bae | H04N 5/50 725/56 |
| 2010/0199312 A1* | 8/2010 | Chang et al. | 725/46 |
| 2010/0251291 A1* | 9/2010 | Pino et al. | 725/34 |
| 2012/0005709 A1* | 1/2012 | Walter | 725/46 |
| 2012/0059825 A1* | 3/2012 | Fishman et al. | 707/737 |
| 2012/0159543 A1* | 6/2012 | Jin et al. | 725/39 |
| 2014/0089974 A1* | 3/2014 | Kim et al. | 725/39 |

* cited by examiner

FIG. 7

INTEGRATED GUIDE ICON 710

| TV CHANNEL | INTEGR NUM | 5:30 – 6:00 PM | 6:00 – 6:30 PM | 6:30 – 7:00 PM |
|---|---|---|---|---|
| QAM 1 | 1 | NEWS 1 | NEWS 1 | NEWS 1 |
| QAM 2 | 2 | LMN NEWS | LMN NEWS | LMN NEWS |
| QAM 3 | 3 | HOOPLA | HOOPLA | HOOPLA |
| QAM 4 | 4 | RERUNS | RERUNS | RERUNS |
| QAM 5 | 5 | SOCCER | FOOTBALL | FOOTBALL |
| ONLINE 1 | 6 | FOREIGN TV | FOREIGN TV | FOREIGN TV |
| QAM 6 | 7 | OLYMPICS | OLYMPICS | OLYMPICS |
| ONLINE 2 | 8 | EXOTIC HOBBY | EXOTIC HOBBY | EXOTIC HOBBY |
| DVR 722 | VOD 724 | CHANNEL STORE 726 | ACTIVE 728 | RECOMMENDED 730 |

ADD CHANNEL 910

| TV CHANNEL | RATING | CC | LIVE TV | RSSS FEED | GUIDE DATA | RSSS FEED | VOD | RSSS FEED |
|---|---|---|---|---|---|---|---|---|
| ONLINE 1 | Y | Y | Y | HTTP://192.168.1.135 | Y |  | Y | HTTP://192.168.1.135 |
| ONLINE 2 | Y | Y | N |  | N |  | N |  |
| ONLINE 3 | Y | Y | Y | HTTP://192.168.1.135 | Y | HTTP://192.168.1.135 | Y | HTTP://192.168.1.135 |
| ONLINE 4 | Y | Y | N |  | N |  | N |  |
| ONLINE 5 | Y | Y | Y |  | Y | HTTP://192.168.1.135 | Y | HTTP://192.168.1.135 |
| ONLINE 6 | Y | Y | Y | HTTP://192.168.1.135 | Y | HTTP://192.168.1.135 | Y | HTTP://192.168.1.135 |
| ONLINE 7 | Y | Y | Y | HTTP://192.168.1.135 | Y | HTTP://192.168.1.135 | Y | HTTP://192.168.1.135 |
| ONLINE 8 | Y | Y | Y | HTTP://192.168.1.135 | Y | HTTP://192.168.1.135 | Y | HTTP://192.168.1.135 |
| ONLINE 9 | Y | Y | Y | HTTP://192.168.1.135 | Y | HTTP://192.168.1.135 | Y | HTTP://192.168.1.135 |

FIG. 9

INTEGRATED VIDEO CONTENT

BACKGROUND

Video service providers currently provide multiple services and programs, including cable television, network television, and video-on-demand, to their customers. In some instances, individual customers may receive combinations of these services from a single video service provider. Video service providers manage relationships with their customers using customer accounts that correspond to the multiple services.

BRIEF DESCRIPTION OF THE DRAWINGS

FIG. 7 is a diagram of an exemplary integrated video guide;

FIG. 9 is a diagram of an administrative web console interface for an integrated video service.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide an integrated interface and support system for integrated video content that includes broadcast video content and video service selected video content. The video service selected video content may be provided via unicast or multicast in, for example, an Internet based system. The broadcast video content may be provided via a quadrature amplitude modulation (QAM) based system. The interface may be provided to a channel store that includes integrated channels that provide video content from the QAM based system and an Internet-based selection of channels. The integrated channels may be provided in a substantially uniform manner. Consistent with embodiments described herein, search, subscription, guide and viewing options may be seamlessly provided to a user. Support is also provided for administrative functions, such as adding channels, pricing, and revenue sharing.

As used herein, the terms "user," "consumer," "subscriber," and/or "customer" may be used interchangeably. Also, the terms "user," "consumer," "subscriber," and/or "customer" are intended to be broadly interpreted to include a user device or a user of a user device.

Figure 1:
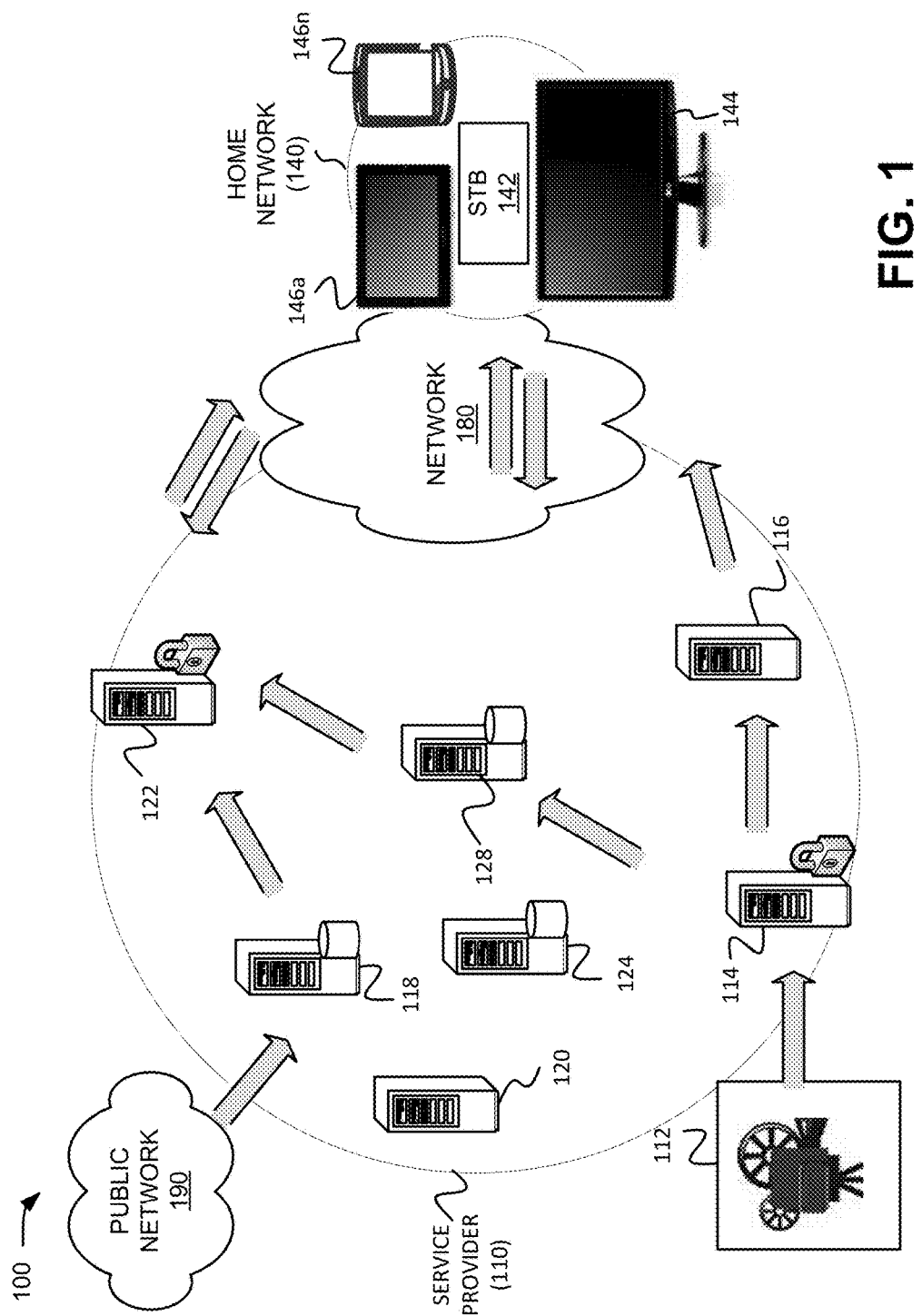
FIG. 1 illustrates an exemplary network in which systems and methods described herein may be implemented.

FIG. 1 illustrates an exemplary environment 100 in which systems and/or methods described herein may be implemented. As shown in FIG. 1, environment 100 may include a service provider network 110, home network 140, an access network 180, and a public network 190. Video service provider network 110 may include a content provider 112 (or alternatively, video service provider network 110 may receive video content from content provider 112), a content processing system 114, a content delivery system 116, a search server 118, a guide server 120, an application server 122, a profile server 124, and a license server 128. Home network 140 may include one or more STBs 142, televisions 144, one or more user devices 146a through 146n, and/or personal computers. Devices and/or networks of FIG. 1 may be connected via wired and/or wireless connections.

Video service provider network 110 may collect, generate, and provide video content to subscribers of an integrated video service. Video content may include, for example, encoded video content in any of a variety of formats, including, for example, Multiview Video Coding (MVC), Moving Picture Experts Group (MPEG)-2 TS, MPEG-4 advanced video coding (AVC)/H.264. The integrated video service may include digital programs in an on-demand or channel broadcast format. Video service provider network 110 may also provide support services for the integrated video service, including authentication, authorization, and billing of subscribers for particular video services.

Content provider 112 may include one or more providers of video content. For example, content provider 112 may include a television network, a cable television station, a film distributor, etc. Content provider 112 may provide video content to content processing system 114 in a variety of signals and formats, such as a baseband video signal, MPEG video, etc.

Content processing system 114 may store and process video content. Content processing system 114 may encode video content using, for example, public/private keys. Content processing system 114 may also transcode the video content. Content processing system 114 may store video content in an encrypted and/or encoded form.

Content delivery system 116 may provide video content, instructions, and/or other information to home network 140 and associated devices, such as set-top-box (STB) 142 and user devices 146a-146n (collectively referred to as user devices 146 and individually as user device 146). In one implementation, content delivery system 116 may provide broadcast video content via a QAM based system that may be limited in bandwidth capacity (i.e., a number and/or quality of channels may be limited based on the capacity of video service provider network 110). In other implementations, content delivery system 116 may provide video content via adaptive coding modulation (ACM).

Content delivery system 116 may temporarily store and provide content requested by user device 146 and/or STB 142. In one implementation, access to content delivery system 116 (e.g., by STB 142 and/or user device 146) may be restricted by a service provider that operates content delivery system 116. For example, access to content delivery system 116 may be restricted to particular users with particular subscription packages and enforced by, for example, password protection, device identifiers (for user devices 146a-146n, STB 142 and/or home network 140), and/or application identifiers (e.g., residing on user devices 146a-146n, STB 142 and/or portable media). Content delivery system 116 may include other devices (not shown), such as a content server, a policy management server, a streaming device, a router, a content cache, etc.

Search server 118 may provide support for an integrated video search function (executed by STBs 142, televisions 144, one or more user devices 146, and/or personal computers at home network 140), for searching among video content that may be provided to subscribers by a content delivery system 116, and video content that may be provided by an associated external network, such as the Internet. The video content may be provided at particular subscribed channels (i.e., an ongoing live broadcast that is part of the subscriber's package), on a pay-per-view basis, or "on demand" (i.e., particular content may be provided upon user request). Search server 118 is described in greater detail below with reference to FIG. 3.

Guide server 120 may provide an integrated video guide to subscribers. The integrated video guide may include integrated video content from a video service provider network 110, such as a QAM based system, and from an additional network, such as the Internet. The integrated video guide may provide listings of channels, viewing times, descriptions of video content, access restrictions, payment requirements, etc. Guide server 120 is described in greater detail below with reference to FIG. 3.

Application server 122 may provide one or more applications that may allow subscribers to browse, purchase, rent, subscribe, and/or view video content. Application server 122 may authenticate a user who desires to purchase, rent, or subscribe to video content. In one implementation, application server 122 may interact with STB 142 or user device 146 using the hypertext transfer protocol (HTTP) or the secure HTTP (HTTPS). In another implementation, application server 122, STB 142 and user device 146 may interact with one another using another type of protocol.

Profile server 124 may store user profile information for users (e.g., users of user devices 146). The user profile information may include, got example, login information (e.g., a user identifier and a password), billing information, address information, types of services to which the user has subscribed, a list of video content purchased by the user, a list of video content rented by the user, a list of channels or video content to which the user has subscribed, a list of users associated with the user account, ratings of video content by the user, a user device identifier (e.g., a media player identifier, a mobile device identifier, a set top box identifier, a personal computer identifier) for devices, such as STB 142, user device 146, etc. Application server 122 may use the user profile information to authenticate a user (or associated users) and may update the user profile information based on the user's activity (e.g., with the user's express permission).

License server 128 may provide key and license management. License server 128 may communicate with user devices 146 and/or STB 142 directly or via application server 122. For example, license server 128 may receive a request from STB 142 for a license relating to video content that STB 142 has downloaded. The license may include information regarding the type of use permitted by user device 146 or STB 142 (e.g., a purchase, a rental, limited shared usage, or a subscription) and a decryption key that permits STB 142 to decrypt the video content or application. In one implementation, the communications between license server 128 and STB 142 may be conducted over a secure channel, may include the use of public and private keys, or may include other forms of secure communication.

Home network 140 may include one or more devices that transmit requests to content delivery system 116, search server 118, guide server 120, application server 122, profile server 124, and/or license server 128, and receive information from content delivery system 116, search server 118, guide server 120, application server 122, profile server 124, and/or license server 128. Home network 140 may include, for example, one or more STBs 142, televisions 144, one or more user devices 146, and/or personal computers. Home network 140 may also include other devices (not shown), such as additional media storage devices, a home router, a gateway (e.g., an optical network terminal (ONT)), etc.

Home network 140 may connect to content delivery system 116, search server 118, guide server 120, application server 122, profile server 124, license server 128, access network 180, and/or other networks (e.g., public network 190). In one implementation, devices in home network 140 may connect to content delivery system 116 (e.g., via access network 180) to receive managed services (e.g., such as a delivery of multimedia content with a guaranteed quality of service (QoS)) via a secure content distribution channel. Thus, access to content delivery system 116 may be restricted to particular users, particular devices, such as STBs 142, user devices 146, and/or applications running on the devices.

STB 142 may receive content from content delivery system 116 and/or an external network, such as the Internet, and output the content to TV 144 and/or user devices 146a-146n. For example, STB 142 may receive a range of channels from content delivery system 116 via QAM. STB 142 may output the content as on-demand content and/or live TV content (i.e., ongoing content that may not be available on an on-demand basis). STB 142 may receive content from an external network, such as the Internet, based on information provided via video service provider network 110. For example, STB 142 may be directed to receive one or more channels via an Internet video feed. STB 142 may include a component (e.g., a cable card or a software application) that plugs into a host device (e.g., TVs 144, and/or other devices, such as personal computers, mobile telephones, etc.) that allows the host device to play content. STB 142 may also be implemented as a home theater personal computer (HTPC), an optical disk player (e.g., digital video disk (DVD) or Blu-Ray™ disc player), a cable card, etc. STB 142 may receive commands from other devices in environment 100, such as a remote control (not shown) and user device 146. STB 142 may include one or more digital video recorders (DVRs) that allow STB 142 to record content and to playback the recorded content at a later time. In one embodiment, STB 142 may include a microphone and/or a camera.

TV 144 may include speakers as well as a display. TV 144 may play content, for example, received from STB 142. While some embodiments described below may use TV 144 to play content, other embodiments may use any device (e.g., a computer or a mobile phone) to play/provide content.

User device 146 may include any device capable of communicating via a network, such as home network 140 and/or access network 180. User device 146 may include an interactive client interface, such as a graphic user interface (GUI. User device 146 may include digital rights management (DRM) functionality to retrieve security information (e.g., decryption keys) and decrypt protected content received from content delivery system 116. Examples of user device 146 may include a mobile phone, a tablet, a personal computer, or another device that may receive video program related items, such as video program related applications and video program related content, and provide the video program related items at user device 146.

Access network 180 may provide customers with multimedia content from, for example, by content delivery system 116. Access network 180 may include a local area network (LAN), a wide area network (WAN), such as a cellular network, a satellite network, a fiber optic network, a private WAN, or a combination of the Internet and a private WAN, etc. that is used to transport data. Although shown as a single element in FIG. 1, access network 180 may include a number of networks that provide services to home network 140. In one implementation, access network 180 may be connected to home network 140 via an optical communication link, such as an optical fiber provided to home network 140. In another implementation, access network 180 may be connected to home network 140 via a coaxial cable. In still another implementation, access network 180 may be connected to home network 140 via a wireless (e.g., satellite) connection.

Public network 190 may include a WAN, an intranet, a telephone network (e.g., the Public Switched Telephone Network), or a combination of networks. Public network 190 may include, for example, an untrusted network, such as the Internet. Public network 190 may further include network devices such as routers, switches, and/or firewalls.

While FIG. 1 shows a particular number and arrangement of networks and/or devices, in practice, environment 100 may include additional networks/devices, fewer networks/devices, different networks/devices, or differently arranged networks/devices than are shown in FIG. 1. For example, content delivery system 116 may be implemented as multiple devices.

In implementations described herein, an integrated video service may be provided via a core network, such as video service provider network 110, and a secondary network, such as the Internet. Further, a channel store, program guide, and a search function that support the integrated video service may be provided.

Figure 2:
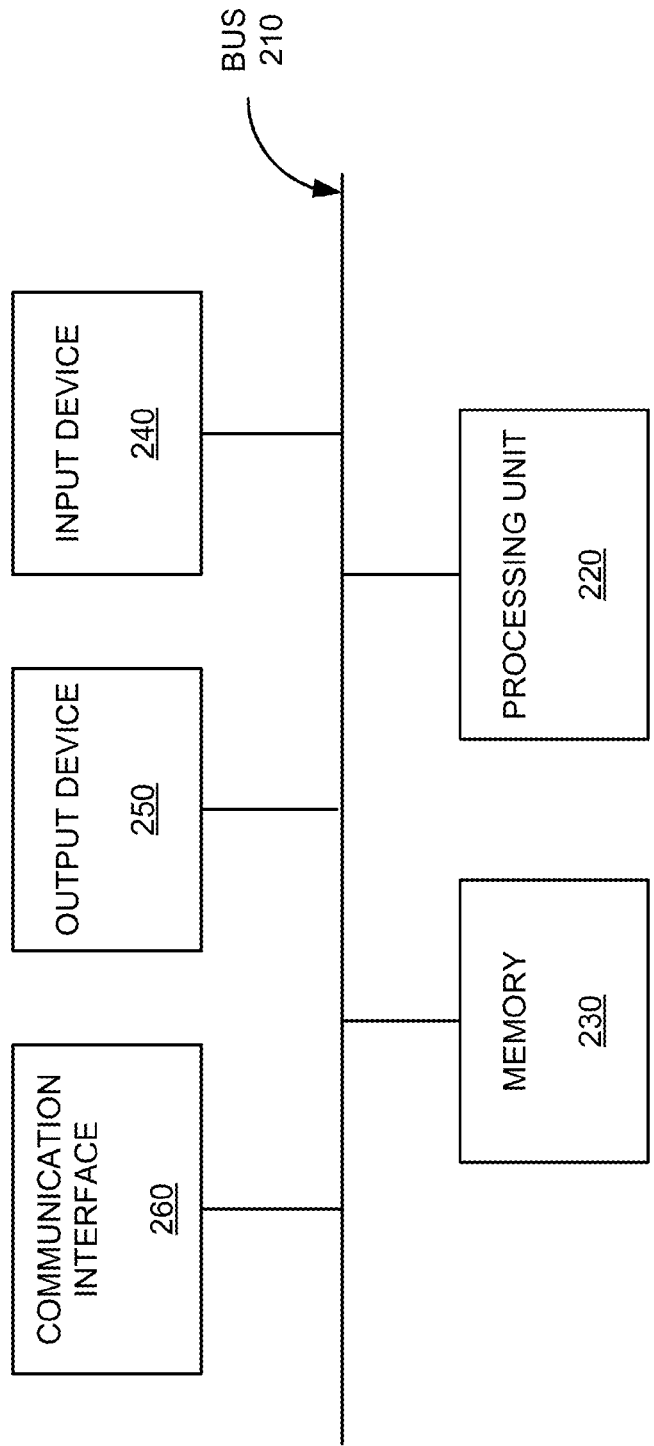
FIG. 2 illustrates an exemplary configuration of one or more of the components of FIG. 1.

FIG. 2 is a diagram of example components of a device 200. Each of content provider 112, content processing system 114, content delivery system 116, search server 118, guide server 120, application server 122, profile server 124, license deserver 128, and/or devices in home network 140, such as STB 142, user devices 146*a*-146*n*, may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
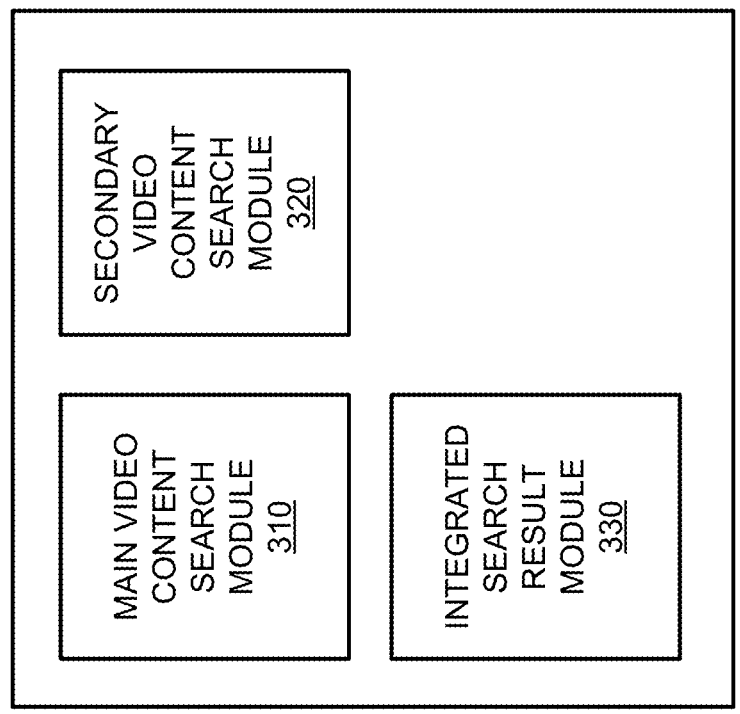
FIG. 3 is a diagram of exemplary functional components of the search server of FIG. 1.

FIG. 3 is a diagram of exemplary functional components of search server 118. In one implementation, the functions described in connection with FIG. 3 may be performed by one or more components of device 200 (FIG. 2). As shown in FIG. 3, search server 118 may include a main video content search module 310, a secondary video content search module 320, and an integrated search result module 330.

Main video content search module 310 may search for video content items that may be provided via content delivery system 116. For example, video content search module 310 may search an associated database that includes information regarding video content items, such as movies, television shows, new broadcasts, etc., which may be provided via content delivery system 116. The information for each video content item may include times at which the video content item may be viewed, a synopsis of the video content, names of people associated with the video content item (e.g., actors, directors, etc.), channels at which the video content item may be viewed, etc.

Secondary video content search module 320 may search for video content items that may be provided via a secondary network, such as the Internet. For example, secondary video content search module 320 may search an associated database that includes information regarding video content items, such as movies, television shows, new broadcasts, etc., which may be provided via the Internet. In some implementations, the video content items identified by the secondary video content search module 320 have relatively lower viewership when compared to those identified by main video content search module 310. Alternatively, the video content items may include content associated with a business partner (e.g., additional channels or on-demand content that are provided by a business partner).

Integrated search result module 330 may integrate (i.e., merge) search results from main video content search module 310 and search results from secondary video content search module 320. For example, integrated search result module 330 may receive search results from main video content search module 310 and search results from secondary video content search module 320 and compile an integrated search result that identifies video content items that may be provided via content delivery system 116 and video content items that may be provided via the Internet. In one implementation, integrated search result module 330 may order search results based on a predetermined ranking scheme (e.g., video content items provided via content delivery system 116 may be assigned additional weight). In another implementation, integrated search result module 330 may order search results based on user profile information, such as previous video content items selected by the user, preferences associated with the user (e.g., parental guidance filters), additional weight placed on more recent items, etc.

According to one implementation, integrated search result module 330 may generate search results based on a current level of user's ability to access content. For example, integrated search result module 330 may assign increased relevance to items for which the user is currently subscribed.

Figure 4:
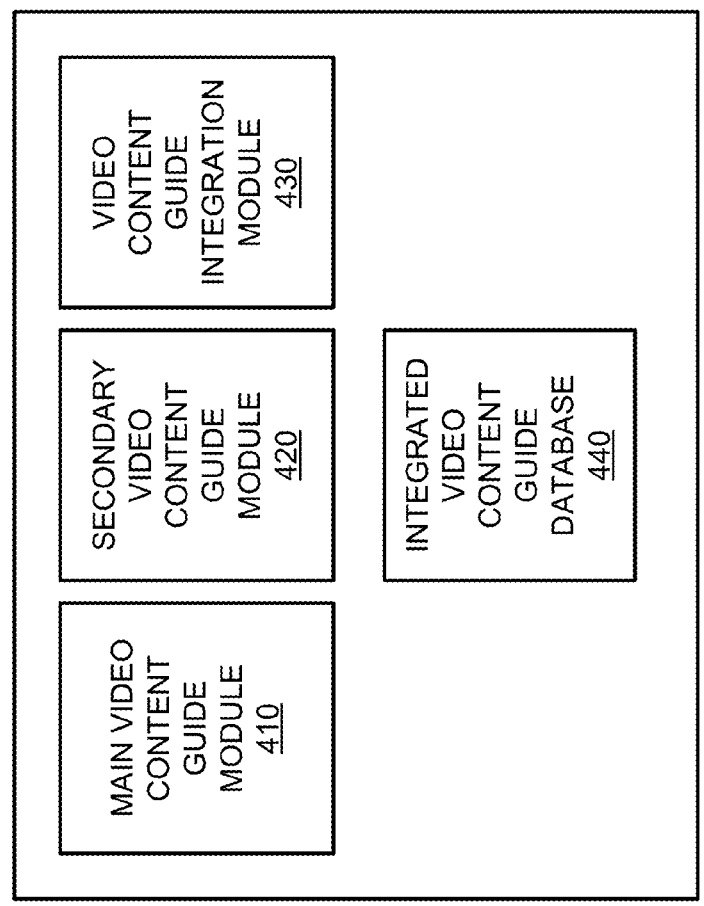
FIG. 4 is a diagram of exemplary functional components of the guide server of FIG. 1.

FIG. 4 is a diagram of exemplary functional components of guide server 120. In one implementation, the functions described in connection with FIG. 4 may be performed by one or more components of device 200 (FIG. 2). As shown in FIG. 4, guide server 120 may include a main video guide module 410, a secondary video guide module 420, a video guide integration module 430, and an integrated video guide database 440.

Guide server 120 may manage the display of guide information for video content items that may be provided via content delivery system 116 and video content items that may be provided via the Internet in a single display, such as shown in integrated video guide 700 described with respect to FIG. 7 below.

Main video guide module 410 may obtain main video guide information, such as a channel, a scheduled viewing time, and a user subscription status for each video content item that may be provided via content delivery system 116. Main video guide module 410 may obtain other guide information for the video content item and/or channel, such as whether the user has selected to display the channel or video content item in the integrated video guide.

Secondary video guide module 420 may identify secondary video guide information, such as a channel, a scheduled viewing time, and a user subscription status for each video content item that may be provided via the Internet. For example, secondary video guide module 420 may receive information (e.g., via the Internet) from a business partner associated with the video content item regarding authorization and a subscription status for the particular channel or video content item. Secondary video guide module 420 may identify other secondary video guide information for the video content item and/or channel, such as whether the user has selected to display the channel or video content item in the integrated video guide.

Integrated guide module 430 may receive main video guide information from main video guide module 410 and secondary video guide information from secondary video guide module 420. Integrated guide module 430 may integrate the main video guide information and the secondary video guide information into an integrated video guide that may be stored in integrated video guide database 440. Integrated guide module 430 may generate the integrated video guide based on user preference, subscription status for video content items, etc. Integrated guide module 430 may store and/or access the user preference, subscription status, etc., in integrated video guide database 440.

Integrated video guide database 440 may include an integrated video guide for each subscriber. Integrated video guide database 440 may also include information that may be used (e.g., by integrated guide module 430) to provide integrated video guides for each subscriber.

According to another embodiment, some of the functions performed by guide server 120 may be implemented by STB 142 based on information transferred via guide server 120. For example, STB 142 may determine an integrated video guide based on general guide information provided by guide server 120 and user specific information, stored locally, or retrieved from other devices in video service provider network 110, such as profile server 124.

Figure 5:
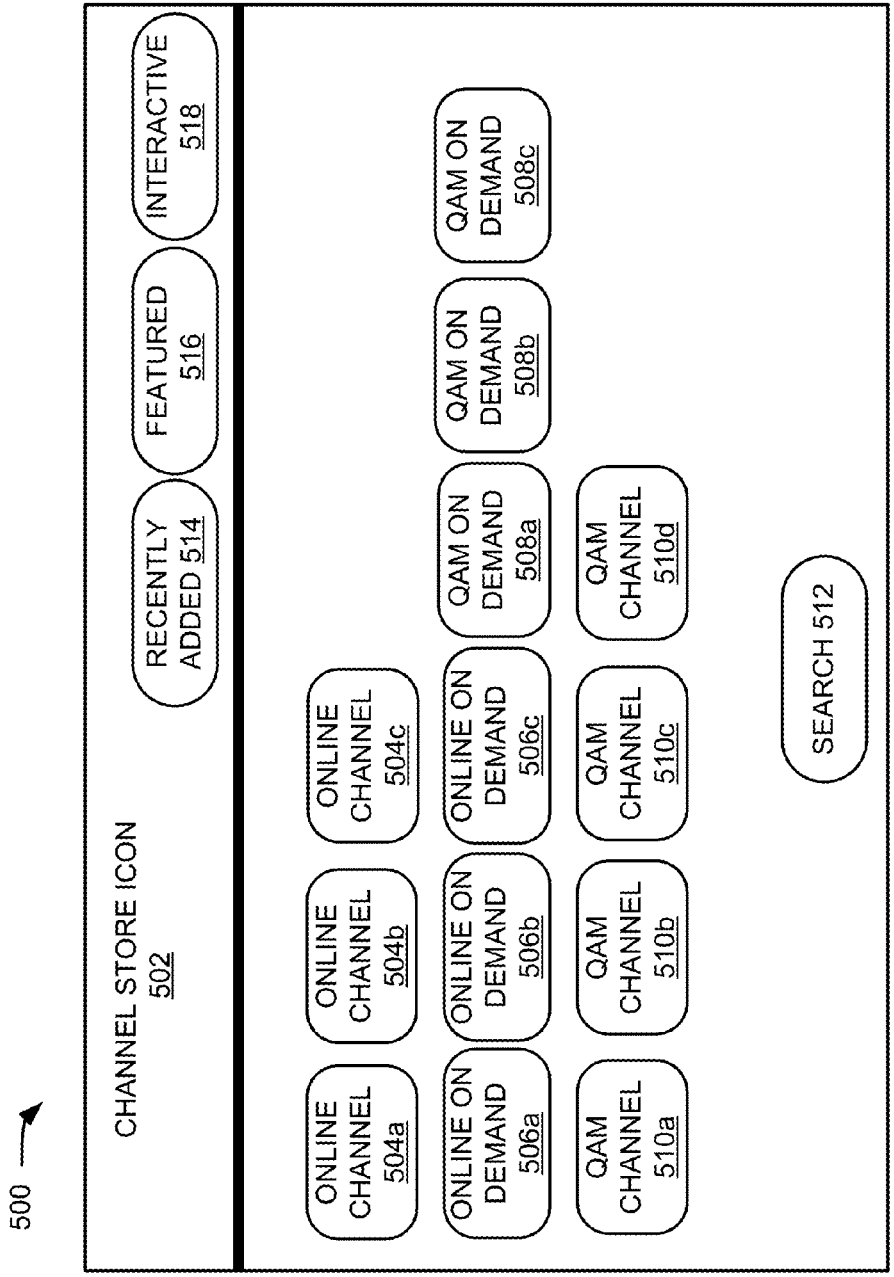
FIG. 5 is a diagram of an exemplary channel store interface for integrated video content from the Internet and a quadrature amplitude modulation (QAM) based system.

FIG. 5 illustrates an exemplary channel store interface 500. Channel store interface 500 may provide an electronic storefront at which channels or video content may be selected (e.g., browsed, rented, or purchased). Information about the selected channels may be incorporated into a user or subscriber's video guide data and user profile information. Channel store interface 500 may be accessed via a client-side device such as STB 142. For example, channel store interface 500 may be accessed on television 144. Alternatively, channel store interface 500 may be accessed on user device 146.

As shown in FIG. 5, channel store interface 500 may include a channel store icon 502, and video content icons based on video content items, including online channels 504a-504c, online on-demand accessible video content items (online on-demand) 506a-506c, QAM on-demand accessible video content items (QAM on demand) 508a-508c, and QAM channels 510a-510d. The channels may be arranged in channel store interface 500 based on a genre of online channels 504, online on-demand 506, QAM on-demand 508, and/or QAM channels 510. Additionally, channel store interface 500 may include video content function icons that may be used to access a function with regard to video content items, such as a search icon 512, a recently added icon 514, a featured icon 516, and an interactive icon 518.

Each of the video content icons may be selected to access video content indicated by the particular video content icon. For example, online channels 504a-504c may each identify a particular online channel that may be selected in association with video service provider network 110 via the Internet. For example, online channel icon 504a may be associated with a reggae music video channel that may be accessed via STB 142 and viewed on a display associated with STB 142. Online channel icon 504a may be associated with an ongoing (i.e., regularly scheduled, non-on demand) video channel accessible via the Internet (e.g., the reggae music channel is Internet based and may be provided by a business partner). Online on-demand icon 506a may be an icon identifying video content items that may be accessed at any time from an Internet source. QAM on-demand icon 508a may be associated with on-demand content that may be provided via content delivery system 116. QAM channel icon 510a may be associated with an ongoing video channel accessible via content delivery system 116.

The user may activate (e.g., "click" on) any of the icons to purchase or obtain access to the channel or video content item (the user may indicate a particular icon in other manners, such as key stroke functions based on highlighted icons, drag and drop, etc.). In some instances, video service provider network 110 (i.e., devices in video service provider network 110) may provide information that allows the user to subscribe to the channel or purchase the particular video content item after completing required steps (e.g., by providing authorization for the purchase of access to the channel). In some instances, video service provider network 110 may receive information indicating authorization from a third party, such as a business partner (e.g., when the user signs up for a channel on the business partner's website) and an indication of a subscription to a channel or purchase of a video content item. The information may be added to the user's profile information.

The video content function icons may be activated for the user to access a particular functions associated with the channels and video content items displayed in channel store interface 500, functions associated with video service provider network 110, and/or functions associated with business partners that may provide online video content via STB 142. For example, by clicking on search icon 512, the user may activate a search function and interface, such as described with respect to search interface 600 and FIG. 6 below. The user may cause video service provider network 110 to provide icons (in some instances, highlighted, isolated or otherwise distinguished icons) indicating recently added channels or video content items in channel store interface 500, by activating recently added icon 514. These channels or video content items may be provided via content delivery system 116 or the Internet. The user may cause video service provider network 110 to identify featured items, by activating on featured icon 516. The user may cause video service provider network 110 to identify interactive content (i.e., a "lean back" experience), by activating on interactive icon 518.

Figure 6:
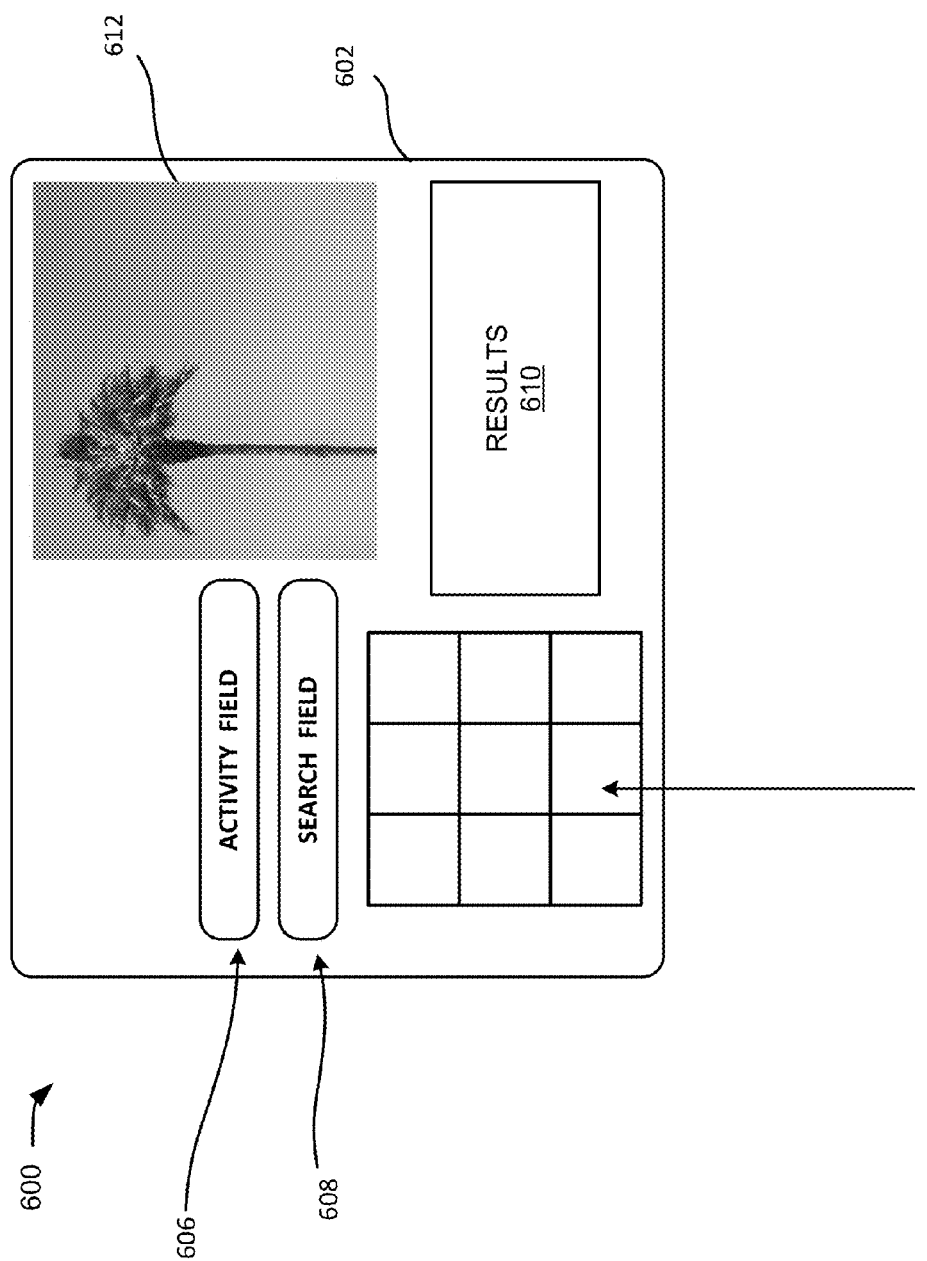
FIG. 6 is a diagram of an exemplary search interface for integrated video content from the Internet and the QAM based system.

FIG. 6 illustrates an exemplary search interface 600. As shown in FIG. 6, search interface 600 includes a display window 602, an alphanumeric keypad 604 (soft keys), an activity field 606, a search field 608, results listing 610 and a content window 612. The particular arrangement and number of components of user interface are illustrated in FIG. 6 for simplicity. Search interface 600 may be displayed on television 144 associated with STB 142.

Referring to FIG. 6, a user may enter a search string using alphanumeric keypad 604 into search field 604. The search string may include keyword that relates to video content that may be provided by content delivery system 116 and/or the Internet. STB 142 may transmit the search string to search server 118.

Search server 118 may search among video service selected video content, which is provided as unicast or multicast, such as content received via the Internet, and broadcast video content, such as content received via content delivery system 116. Search server 118 may return a list of content items/channels that may be displayed in results list 610. For example, while the user types the search string in search field 604, results may be shown in results list 610 for the user to select. Once the user selects one of the content items, details of the selected content item may be shown. Search server 118 may return a list, of content items that may be provided by content delivery system 116 and/or the Internet. The list may be sorted and/or ranked based on a predetermined relative weighting formula (e.g., online channels may be given a relative weighting factor with respect to QAM channels that results in lower or higher rating in the list) or based on predetermined criteria associated with individual channels or video content (e.g., video content items that the video service provider wishes to promote may be given additional weight in the search results). The relative weighting factor may determine a relative relevance of search results based on the plurality of available broadcast video content to the search results based on the plurality of available video service selected video content. Relative weighting factors may be applied to sub categories of online channels or to all online channels.

FIG. 7 is a diagram of an exemplary integrated video guide interface 700. As shown in FIG. 7, integrated video guide interface 700 may include an integrated guide icon 710, a plurality of channels 712, which may include QAM channels (QAM 1 to QAM 6) and online channels (online 1 to online 2), corresponding integrated channel number (integr num.) 714 for each of the channels 712, and time slots 716 at which programs (e.g., news 1 on integrated channel number 714 1, LMN news on integrated channel number 714 2) may be scheduled on the channels 712. Programs on each channels 712 are presented in accordance with their scheduled times (e.g., Hoopla is scheduled at 5:30 to 6:30 on QAM 3).

Integrated video guide interface 700 may provide a scrollable listing, of channels, that identifies video content items that may be provided by content delivery system 116 and/or the Internet. Video content that may be provided by content delivery system 116 may not be differentiated from video content that may be provided via the Internet in integrated video guide interface 700, which, from the user's viewpoint, may result in seamless access to programs provided by content delivery system 116 and the Internet. According to one embodiment as described with respect to FIG. 7, integrated video guide interface 700 may be displayed on the screen of television 144, which is associated with STB 142. Integrated video guide interface 700 may allow the user to select video content, by inputting instructions to STB 142, for instance via an associated remote control. The user may scroll through channels 712 in order integrated channel number 714 are listed or may input a particular integrated channel number 714 to select a channel 712.

As shown in FIG. 7, integrated video guide interface 700 may include multiple options 720 including DVR 722, video on demand (VOD) 724, channel store 726, active 728, and recommended 730. The user may select DVR 722 to access DVR functionality, including playback of recorded video content and scheduling for recording video content. The user may select VOD 724 to access on-demand content that may be provided by content delivery system 116 or the Internet. The user may select channel store 726 to access a channel store at which the user may subscribe to additional channels, such as the one shown with respect to FIG. 5 and channel store interface 500. The user may select active 728 to distinguish channels that are currently available for the user to view. For example, integrated video guide interface 700 may include channels or scheduled video content to which the user has not subscribed but which the user wishes to include in the integrated video guide interface 700, such as seasonal channels (e.g., a particular sports network). By selecting active 728, the user may remove channels that are not currently available for viewing from the integrated video guide interface 700 (e.g., the user may remove seasonal sports channels). The user may select recommended 730 and recommended video content items may be highlighted. The recommended video content items may be selected and provided by video service provider network 110 based on recommendation factors, including video content that the user has previously viewed, purchased, browsed, etc. For example, video service provider network 110 may analyze the previously viewed movies to determine genres of movies that the user is likely to view and search available programs that the user has not previously viewed to determine recommended video content.

According to one embodiment, the user may select channels 712 that are to be included in integrated video guide interface 700. The user may choose to include channels 712 to which the user is currently subscribed. Alternatively, the user may include selected channels in which the user has an interest but to which the user is not currently subscribed. For example, a user that has a particular interest in Bob Marley may have channels that include video content about Bob Marley in integrated video guide interface 700, regardless of whether the user is currently subscribed to that channel 712 (e.g., channels that carry content that may be of interest to the user may "pop up" in integrated video guide interface 700). The user may subscribe to unsubscribed channels that appear in integrated video guide interface 700. The user may also dismiss unsubscribed channels from integrated video guide interface 700.

According to one embodiment, video service provider network 110 may identify (e.g., based on a selection by the user) non-time based video content that is to be included in the integrated video guide. The non-time based video content may be presented in the integrated video guide, for example without a time identifier. Video service provider network 110 may identify a user selected method of grouping channels, for example based on movie genres, music, news, sports, etc., and present the integrated video guide based on the user selected grouping (e.g., all sports content may be presented grouped together in the integrated video guide).

Figure 8:
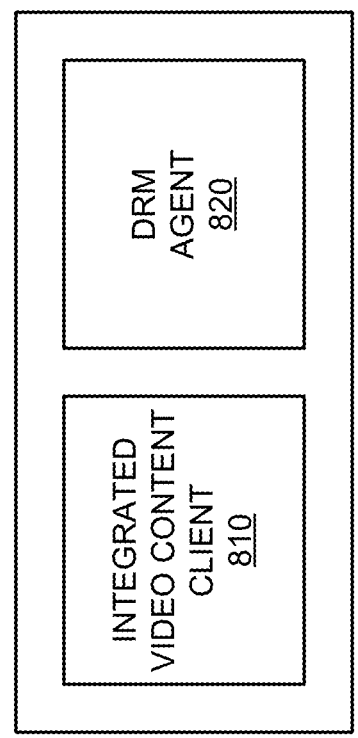
FIG. 8 is a diagram of example functional components of the set-top-box of FIG. 1.

FIG. 8 is a diagram of example functional components of STB 142 (or user device 146). In one implementation, the functions described in connection with FIG. 8 may be performed by one or more components of device 200 (FIG. 2). As shown in FIG. 8, STB 142 may include an integrated video content client 810 and a DRM agent 820.

Integrated video content client 810 may include hardware or a combination of hardware and software that may enable STB 142 (or user device 146) to interface with content delivery system 116, search server 118, guide server 120, application server 122, profile server 124, and/or license deserver 128 and to present content selection options for integrated video content from content delivery system 116 and the Internet to the user in a seamless manner. Integrated video content client 810 may provide client-side support for applications based on the integrated video content. Integrated video content client 810 may include an interactive client interface that allows a user provide to input, such as user passwords, preferences, and selections from a list of available content, such as those described with reference to FIGS. 5, 6, and 7.

DRM agent 820 may include hardware or a combination of hardware and software that may retrieve security information (e.g., decryption keys) from license server 128 (or another device) to access protected content received from content delivery system 116. For example, DRM agent 820 may communicate with integrated video content client 810 to identify selected content and coordinate the receipt of DRM security information (e.g., from license server 128) with the protected content from content delivery system 116. Protected content may include, for example, any content encrypted to enforce copyright restrictions.

Although FIG. 8 shows example functional components of STB 142, in other implementations, STB 142 may include fewer functional components, different functional components, differently arranged functional components, and/or additional functional components than depicted in FIG. 8. Alternatively, or additionally, one or more functional components of STB 142 may perform one or more other tasks described as being performed by one or more other functional components of STB 142.

FIG. 9 illustrates an exemplary administrative web console interface 900. Administrative web console interface 900 may provide functionality for administrative personnel, associated with a video service provider or a business partner of the video service provider, to subscribe to additional channels in the integrated video service. The administrative personnel may be authenticated and authorized to access administrative web console interface 900 and subsequently, to access portions of video service provider network 110. Administrative web console interface 900 may be accessed on a computing device via a web application.

As shown in FIG. 9, the administrative user may add one or more channel 712 and indicate functionalities provided for the channel 712. The yes (Y) or no (N) in each column of console 700 indicates whether a particular function is included with/for the corresponding channel 712. For example, an administrator may add channels 712 that include: a rating 914 (e.g., a parental guidance rating such as restricted (R), parental guidance 13 (PG-13), etc.); close captioning (CC) 916; live TV 918, which may include a corresponding resource description framework (RDF) site summary (RSS) feed from which updates to the live video for the channel 712 may be accessed; guide data 920, which may include a corresponding RSS feed from which updates to the guide data for the channel 712 may be accessed; and VOD 922, which may include a corresponding RSS feed from which updates to VOD data for the channel 712 may be accessed.

Although not shown, administrative web console interface 900 may include another functionality that may allow an administrative user to assign an integrated channel number 714 to the channel 712, and to determine pricing and revenue split for the channel 712 (i.e., between the video service provider and the business partner).

Figure 10:
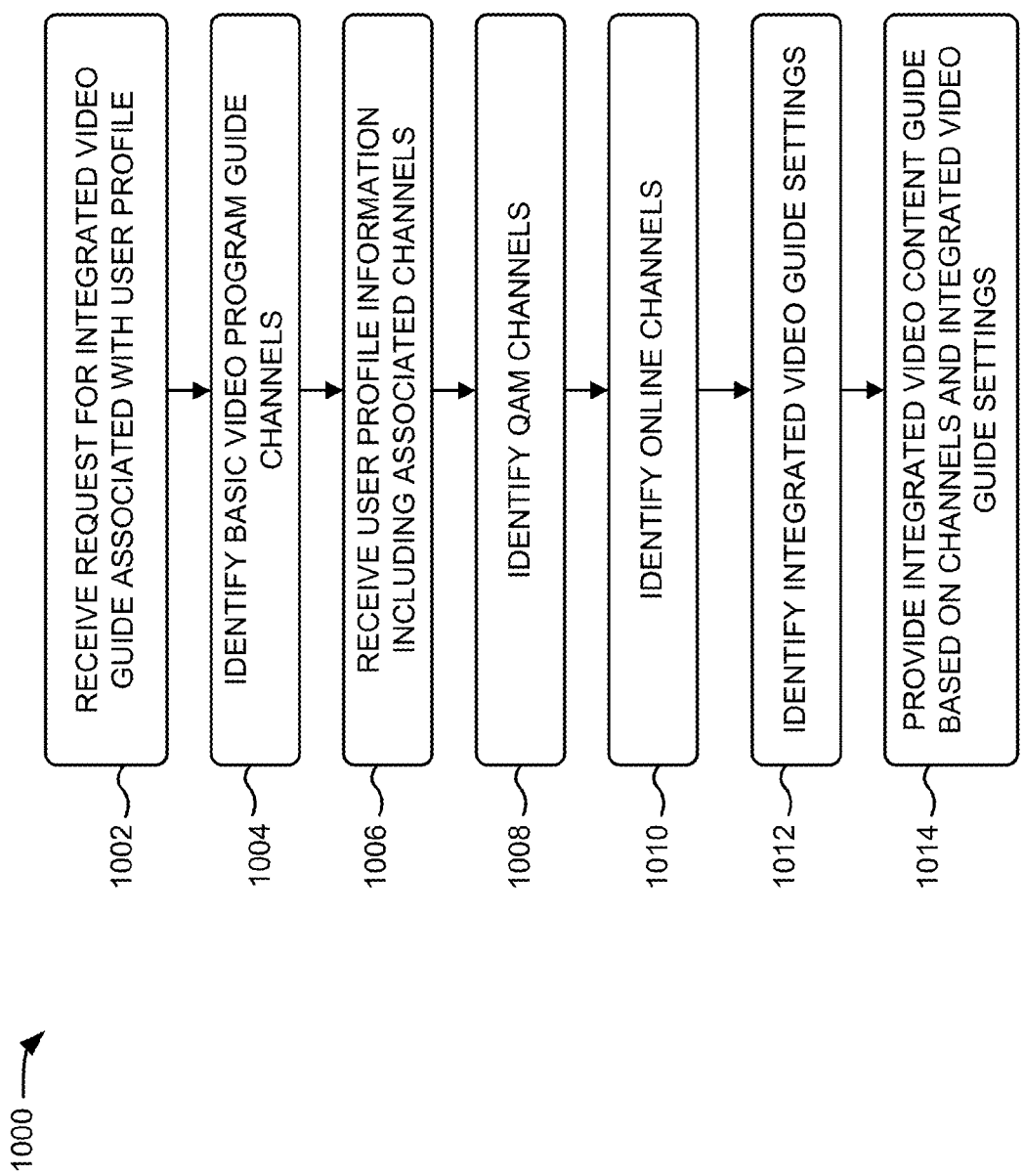
FIG. 10 is a flowchart of an exemplary process for providing an integrated video guide.

FIG. 10 is a flowchart of an exemplary process 1000 for providing an integrated video guide. Process 1000 may execute in guide server 120. It should be apparent that the process discussed below with respect to FIG. 10 represents a generalized illustration and that blocks/steps may be added or existing blocks/steps may be removed, modified or rearranged without departing from the scope of process 1000.

At block 1002, guide server 120 may receive a request for an integrated video guide associated with a particular user (or user profile, indicated, for example, by a user identifier included with the request). For example, a user of STB 142 may send a request for access to the integrated video guide for an integrated video service (e.g., the user may turn on STB 142, which may automatically generate the request). The integrated video service may include QAM video content from a QA) based system and online video content from an Internet based system.

At block 1004, guide server 120 may identify basic video channels. For example, guide server 120 may identify a range(s) of channels that are offered to all subscribers of the integrated video service. These channels may include public channels and basic cable channels. Guide server 120 may also determine promotional channels that are to be included in the integrated video guide.

Guide server 120 may receive user profile information associated with the user, including associated channels (block 1006). The associated channels may include channels that the user has subscribed to and channels in which the user has indicated an interest. For example, guide server 120 may communicate with profile server 124 to determine the user profile information. The user profile information may also identify settings associated with the user and a video content history associated with the user.

Guide server 120 may identify QAM channels that are to be included in the integrated video guide based on the user profile information (block 1008). Guide server 120 may search among channels that the user has subscribed to and determine the QAM channels (or channels carried on a core network) among the subscribed channels. Guide server 120 may also determine QAM channels, which the user wishes to include in the video guide that the user has not currently subscribed to.

Guide server 120 may determine online channels among the user's subscribed channels (block 1010). Guide server 120 may also determine online channels, which the user has expressed an interest in but to which the user is not currently subscribed, that are to be included in the integrated video guide.

At block 1012, guide server 120 may identify settings for the integrated video content associated with the user. For example, guide server 120 may identify settings that determine a manner in which the channels are to be ordered, a time range over which programs are to be displayed, a number of channels to be displayed, etc. The channels may be grouped based on categories, such as sports, movies, music, and selected groups identified by the user, such as favorites, etc.

Guide server 120 may provide the integrated video guide based on the QAM channels, the online channels and the settings for the integrated video content associated with the user (block 1014). The integrated video guide may be scrollable and include online channels and QAM channels that are presented in a substantially similar manner. The user may click through the channels without being made aware of the difference in networks that provide the channels.

Systems and/or methods described herein may implement an integrated video service that includes broadcast video content from a core network and video service selected content from additional networks, such as video content provided via the Internet. The method provides the ability to search among all content that may be provided to the user (i.e., broadcast video content and video service selected content from additional networks) and renders channels in an integrated video guide. The user may select channels with video content, from the core network and video content from additional networks, that are presented to the user in a uniform manner, e.g., by selecting the channels from a menu or "surfing" through the channels.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 10, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
    identifying a plurality of video content available from a plurality of sources for access in association with a service provider, wherein the plurality of sources includes basic video channels that are provided to subscribers of a video service, online channels, and video service subscription channels;
    identifying a subset of the plurality of video content that is subscribed to by a user associated with a user profile;
    presenting the subset of the plurality of subscribed to video content in an integrated video guide, wherein the integrated video guide is time based;
    receiving a user request to include only currently active subscribed to video content in the integrated video guide, wherein the currently active subscribed to video content includes subscribed to video content that is viewable at a time that the user request is received;
    removing a portion of the subset of the plurality of subscribed to video content that is not currently available for viewing;
    presenting the subset of the plurality of video content that does not include the removed portion of the subset in the integrated video guide;
    generating a channel store interface that displays icons for additional currently unsubscribed channels that are available for subscription by the user, from the plurality of video content, and provides access to at least one function based on the plurality of video content via at least one function icon;
    receiving a selection of at least one basic video channel, online channel or video service subscription channel from the additional currently unsubscribed channels displayed at the channel store interface that are provided to the subscribers of the video service; and
    integrating the selected at least one basic video channel, online channel or video service subscription channel from the channel store interface into the integrated video guide.

2. The computer-implemented method of claim 1, wherein the basic video channels are provided via a quadrature amplitude modulation (QAM) based system and the online channels are provided via an Internet based system.

3. The computer-implemented method of claim 1, further comprising:
    identifying integrated video guide settings, associated with the user profile, which determine a manner in which the selected at least one basic video channel, online channel or video service subscription channel is to be presented, wherein the manner includes at least one of a category based grouping, a selected group identified by the user profile, or a number of channels; and presenting the integrated video guide based on the integrated video guide settings.

4. The computer-implemented method of claim 3, wherein identifying the integrated video guide settings further comprises:

identifying recommendation factors associated with the user profile;

identifying recommended video content based on the recommendation factors; and providing information about the recommended video content in the integrated video guide.

5. The computer-implemented method of claim 3, wherein identifying the integrated video guide settings further comprises:

identifying at least one inactive channel among the selected at least one basic video channel, online channel or video service subscription channel based on indications that the at least one inactive channel is not currently providing video content; and removing the at least one inactive channel from the integrated video guide.

6. The computer-implemented method of claim 3, wherein identifying the integrated video guide settings further comprises:

identifying a user selected method of grouping channels, wherein the grouping includes one or more of movie genres, music, news, or sports; and presenting the integrated video guide based on the user selected method.

7. The computer-implemented method of claim 1, further comprising:

identifying non-time based video content associated with the user profile; and presenting information about the non-time based video content in the integrated video guide.

8. The computer-implemented method of claim 1, further comprising:

receiving information indicating authorization from a third party, wherein the user signs up for an online channel via a website associated with the third party.

9. The computer-implemented method of claim 1, further comprising:

presenting an administrative web console interface in association with the channel store interface, wherein the administrative web console interface allows administrative users to add channels to the channel store interface and to update information associated with the channels based on at least one resource description framework (RDF) site summary (RSS) feed associated with the channels.

10. The computer-implemented method of claim 1, further comprising:

presenting a search interface associated with the channel store interface based on input received in association with a search icon, wherein the search interface is configured to receive a search string and return a listing of video content that is sorted based on a predetermined relative weighting factor associated with each of the plurality of sources.

11. The computer-implemented method of claim 10, further comprising:

providing the listing of video content sorted based on a level of access to the video content associated with the user profile.

12. The computer-implemented method of claim 1, further comprising:

including currently unsubscribed channels in the integrated video guide based on an interest level associated with the user profile.

13. A device, comprising:

a memory to store a plurality of instructions; and a processor configured to execute the instructions in the memory to:

identify a plurality of video content available for access from a plurality of sources in association with a service provider, wherein the plurality of sources includes basic video channels that are provided to subscribers of a video service, online channels, and video service subscription channels;

identify a subset of the plurality of video content that are subscribed to by a user in association with a user profile;

present the subset of the plurality of subscribed to video content in an integrated video guide, wherein the integrated video guide is time based;

receive a user request to include only currently active video content in the integrated video guide, wherein the currently active subscribed to video content includes subscribed to video content that is viewable at a time that the user request is received;

remove a portion of the subset of the plurality of subscribed to video content that is not currently available for viewing;

present the subset of the plurality of video content that does not include the removed portion of the subset in the integrated video guide;

generate a channel store interface that displays icons for additional currently unsubscribed channels that are available for subscription by the user, from the plurality of video content, to the subset of the plurality of video content and provides access to at least one function based on the plurality of video content via at least one function icon;

receive a selection of at least one basic video channel, online channel or video service subscription channel from additional currently unsubscribed channels displayed at a channel store interface that are provided to the subscribers of the video service; and integrate the selected at least one basic video channel, online channel or video service subscription channel from the channel store interface into the integrated video guide.

14. The device of claim 13, wherein the processor is further configured to execute the instructions to:

identify integrated video guide settings, associated with the user profile, which determine a manner in which the selected at least one selected basic video channel, online channel or video service subscription channel is to be presented, wherein the manner includes at least one of a category based grouping, a selected group identified by the user profile, or a number of channels; and present the integrated video guide based on the integrated video guide settings.

15. The device of claim 14, wherein, when identifying the integrated video guide settings, the processor is further configured to execute the instructions to:

identify recommendation factors associated with the user profile;

identify recommended video content based on the recommendation factors; and provide information about the recommended video content in the integrated video guide.

16. A non-transitory computer-readable medium including instructions to be executed by a processor, the instructions, when executed by the processor, cause the processor to:

identify a plurality of video content available from a plurality of sources for access in association with a service provider, wherein the plurality of sources includes basic video channels that are provided to subscribers of a video service, online channels, and video service subscription channels;

identify a subset of the plurality of video content that are subscribed to by a user associated with a user profile;

present the subset of the plurality of subscribed to video content in an integrated video guide, wherein the integrated video guide is time based;

receive a user request to include only currently active video content in the integrated video guide, wherein the currently active subscribed to video content includes subscribed to video content that is viewable at a time that the user request is received;

remove a portion of the subset of the plurality of video content that is not currently available for viewing;

present the subset of the plurality of video content that does not include the removed portion of the subset in the integrated video guide;

generate a channel store interface that displays icons for additional currently unsubscribed channels that are available for subscription by the user, from the plurality of video content, and provides access to at least one function based on the plurality of video content via at least one function icon;

receive a selection of at least one basic video channel, online channel or video service subscription channel from the additional currently unsubscribed channels displayed at the channel store interface that are provided to the subscribers of the video service; and integrate the selected at least one basic video channel, online channel or video service subscription channel from the channel store interface into the integrated video guide.

17. The non-transitory computer-readable medium of claim 16, wherein the one or more instructions further includes instructions for causing the processor to:

identify integrated video guide settings, associated with the user profile, which determine a manner in which information about the selected at least one basic video channel, online channel or video service subscription channel is to be presented, wherein the manner includes at least one of a category based grouping, a selected group identified by the user profile, or a number of channels; and present the integrated video guide based on the integrated video guide settings.

18. The non-transitory computer-readable medium of claim 17, wherein, when identifying the integrated video guide settings, the one or more instructions further includes instructions for causing the processor to:

identify recommendation factors associated with the user profile;

identify recommended video content based on the recommendation factors; and provide information about the recommended video content in the integrated video guide.

19. The non-transitory computer-readable medium of claim 17, wherein, when identifying the integrated video guide settings, the one or more instructions further includes instructions for causing the processor to:

identify at least one inactive channel among the selected at least one basic video channel, online channel or video service subscription channel based on indications that the inactive channels are not currently providing video content; and remove the at least one inactive channel from the integrated video guide.

20. The non-transitory computer-readable medium of claim 16, wherein the basic channels are provided via a quadrature amplitude modulation (QAM) based system and the online channels are provided via an Internet based system.

* * * * *